United States Patent
Katz et al.

[11] Patent Number: 6,023,879
[45] Date of Patent: Feb. 15, 2000

[54] METHOD OF CONTROLLING SUBTERRANEAN TERMITES AND ASSOCIATED APPARATUS

[76] Inventors: Harry Katz, Berkshire E 3076, Deerfield Beach, Fla. 33442; Samuel M. Creeger, 6306 Bartlett St., Pittsburgh, Pa. 15217

[21] Appl. No.: 08/864,144

[22] Filed: May 28, 1997

Related U.S. Application Data

[62] Division of application No. 08/611,717, Mar. 6, 1996.
[51] Int. Cl.$^7$ .................................................. A01M 1/24
[52] U.S. Cl. ............................................... 43/131; 43/124
[58] Field of Search ............................. 43/124, 131, 109, 43/900

[56] References Cited

U.S. PATENT DOCUMENTS 5,365,692  11/1994  Gustafson .................................. 43/124

OTHER PUBLICATIONS

P. Fehrenbach, "The Sentricon Colony Elimination System," Pest Control Technology, pp. 54–50 and 125 (1994).
"Sentricon: A Report From The Field," Pest Control Technology, pp. 58–60 (plus unnumbered page contd. from p. 60, (Apr. 1995).
W. Quarles, "New Technologies for Termite Control," IPM Practitioner, vol. XVII, No. 5/6, pp. 1–9, (May/Jun. 1995).

*Primary Examiner*—David A. Scherbel
*Assistant Examiner*—Anthony Ojini
*Attorney, Agent, or Firm*—Arnold B. Silverman; Eckert Seamans Cherin & Mellott, LLC

[57] ABSTRACT

The method for controlling termites includes providing a plurality of bait stations disposed within or adjacent to a region to be controlled and delivering water to zones around the bait stations to provide a greater moisture content within the soil within the zones than in adjacent areas in order to attract termites to said bait stations. The delivery of water to the zones may be effected by an elongated hose having discharge openings adjacent to or within the high moisture zones. Periodically, the moisture content of the soil within the zones may be measured and an adjustment in the water delivery rate made if the moisture content departs from a desired range. The bait station may consist of an apertured container containing termite food and a termiticide. Associated apparatus is provided.

30 Claims, 2 Drawing Sheets

METHOD OF CONTROLLING SUBTERRANEAN TERMITES AND ASSOCIATED APPARATUS

This is a division of application Ser. No. 08/611,717, filed Mar. 6, 1996.

BACKGROUND OF THE INVENTION

1. Field of the Invention

The present invention provides a method and associated apparatus for more efficiently controlling subterranean termites by enhancing the likelihood that they will be positively attracted to the bait stations.

2. Description of the Prior Art

It has long been known that termites can enter homes and other man-made structures and cause serious damage. It has been reported in fact that termites cause more damage to wood containing buildings in the United States than any other type of insect. Most of the termite damage in the United States is caused by subterranean termites. While termites, as wood-destroying insects, play an important beneficial role in recycling and decomposition of vegetable matter, such as fallen trees, for example, into soil components, in instances where damage to or loss of buildings or other manmade structures is involved, it is critical that efficient means for limiting termite damage and, where possible, destroying termite colonies be provided.

Termites are insects in the order Isoptera. They are social insects that live in colonies and whose members have different physical characteristics and perform different functions. Termites hatch from an egg and develop through gradual metamorphosis to one of four general adult forms. The four adult forms are (a) the worker, (b) the soldier, (c) the secondary reproductives, and (d) the primary queen and king.

Workers make up the largest part of the colony. They construct and repair the termite nest, care for the eggs and young, and forage for food for the members of the colony. These are the colony members that cause damage to wood.

The soldier termite serves to protect the termite colony from attack by termite predators, such as ants, which are the principal natural termite predator. The soldier termite is conspicuous by its enlarged head and mandibles.

Numerous secondary reproductives develop in mature termite colonies. Secondary reproductives lay eggs, but the eggs develop only into worker termites as long as the primary mother queen is alive and functioning. Collectively, the secondary reproductives can produce more eggs than the mother queen.

The primary queen and king are the winged reproductives that swarm from a mature colony, fly a short distance from the nest, shed their wings, and pair off to make a chamber and start a new termite colony in a suitable substrate, such as moist soil under a tree stump or cellulose debris. It takes several years for this primary queen and king to rear a colony that is large and mature enough to produce and send out winged colonizing swarmers.

A colony of subterranean termites has requirements of protection, moisture and food. The initial female (queen) and male (king) termite will select a site which usually includes moist, partially rotted wood in contact with the soil. After establishing the site, the pair will mate and the queen will begin laying eggs. Usually, only a few eggs are laid the first few months and the queen and king will care for the young termites until the young termites are mature enough to forage for food and begin caring for the queen and king. As the queen matures, she produces more eggs. The foraging workers expand the size of the nest and construct passageways through the soil and mud-like tubes over surfaces through which they move and explore for additional sources of food. In these passageways, the termites maintain a highly humid atmosphere that is essential for their survival. Termites have a particular need for moisture and high humidity because, in comparison to most other insects, termites have a much thinner wax-like coating which is insufficient to protect them from desiccation at ambient humidity levels. For termites, moisture is more important to survival than food. For example, an entire termite colony will abandon a site that contains adequate food but that has become dry, for another site where water has been found to be more available. The termite's remarkable ability to detect an elevation of vapor pressure and move toward sources of moisture and to conserve moisture by constructing special tubes have contributed to its remarkable success throughout earth's history.

The termite colony can be considered to be an enormous amorphous organism. Like a giant amoeba, its foraging workers poke and explore in all directions from their termitaria in a continuous search for food and water for a growing population. In their constant search for food, foraging termites bite into anything softer than their hard teeth including, for example, leather, PVC pipe, and swimming pool liners.

Information related to sources of new food, threats to the colony, or damage to the nest are communicated from one termite to another by chemical odor (pheromone) communication, touch (tactile) communication, and vibrations produced by soldier termites banging their heads on the walls of the nest.

An ideal climate was created for termites when modern man developed homes and other buildings in termites' ancient homeland—the forest. In constructing homes, large numbers of huge trees were cut and removed leaving behind vast amounts of termite food in the form of tree root systems. However, as the termites depleted these food sources, they became attracted to the moisture around human home sites where lawns and ornamental plants were frequently watered, especially during dry spells. Attracted by the moisture near the foundation of the home, the foraging termites inevitably found scrap lumber, form lumber, and other cellulose debris left under and around the home by the home builder. Further foraging led the termites to the foundation wall of the home itself where numerous mortar breaks and cracks in the foundation wall provided easy access to the structure's wooden joists, framing and cellulose contents.

Older homes in established communities are particularly vulnerable to termite attack since original ornamental plants surrounding the older home have usually died and been replaced, leaving old root systems behind. In addition, leaky hose bibs and water pipes are more common in older homes than newer homes. Also, improper drainage from roofs or at the downspout outlet often directs massive amounts of rainwater along the foundation of homes. These conditions are overwhelmingly powerful attractants for termites to the site.

The best time to protect man-made structures from termite damage is during the planning and construction of the structure. Proper site location, good foundation and building design, treatment of the soil under and around the foundation, and use of treated lumber coupled with periodic inspections will protect structures for many years. Exceptionally effective protection for up to several decades was provided by the termiticide chlordane when it was used as a pretreatment in the soil under and around the foundation. However, cancellation of the registration of chlordane by the United States Environmental Protection Agency has eliminated it as a tool for protection against termites. None of the new termiticides that have replaced chlordane possess chlordane's ability to diffuse through the soil and its long residual termiticide properties.

Even the best planned and constructed buildings do come under termite attack. Termite workers are always foraging for new sources of food. Due to cracks in a building's construction material, faulty building design, or inadvertent gaps in a termiticide soil treatment due to imprecise distribution of termiticide in the soil, termites often can gain entry into a building and cause damage to the lumber therein.

After termite presence has been detected in an existing structure either by inspection, the chance notice of termite tubes or damaged wood, or the presence of swarmers in the home, there are several known means available to eliminate the termite infestation. The most often used technique is to apply chemical termiticides in the soil under the home and around the foundation. Other techniques include mechanical alteration of the building, removal of wood and other termite food sources from the vicinity, use of ventilation with vapor barriers, use of non-chemical termiticides such as nematodes, and barriers of sand of specific mesh size. In some cases, injection of a termiticide with a pressurized aerosol container into termite galleries in infested wood members, has been shown to destroy a colony of subterranean termites. However, no means of termite control as effective as chlordane has been found.

It has been known to employ bait stations in efforts to control termites. See U.S. Pat. Nos. 5,365,692 and 4,329,726.

To compensate for the limited effectiveness and/or failure of post-chlordane termiticides, termiticide researchers and manufacturers have recently developed and field tested a new means of termite control with some success. The new means of termite control is based on killing the termite colony rather than just use of a chemical termiticide barrier to block termite entry into the building. The researchers have developed termite bait stations composed of perforated, plastic tubes each containing a cellulose core. The bait stations are placed beneath the surface of the soil near the structure's foundation or on the edge of a patio or sidewalk by a licensed pest control operator. The pest control operator contracts to visit the site periodically after installation to check these bait stations for evidence of termite feeding or infestation. If termite presence is found in a bait station, the cellulose core is replaced with a new cellulose core that contains a termiticide such as a slow-acting toxicant or an insect growth regulator. See, generally, Fehrenboch, "Sentricon Colony Elimination System," Pest Control Technology, pp. 54–60, 125 (1994); Quarles, "New Technologies for Termite Control," The IPM Practitioner, Vol. XVII, No. 516, pp. 1–9 (1995); and "Sentricon: A Report from the Field," Pest Control Technology, pp. 58–60, 64 (1995).

Whether a slow-acting toxicant or an insect growth regulator is used, the termite's system of feeding one another including the reproductives distributes the termiticide throughout the colony. The slow-acting toxicant begins to exhibit its toxic effect only after the toxicant has been distributed throughout a significant portion of the colony. In the case of the insect growth regulator, the approximate ratio of 1 soldier to 10 workers is reversed. As soldiers rely on the workers to feed them, the colony starves and perishes after a few weeks.

In tests performed by Dr. Nan Y. Su and Dr. Rudy Scheffrahn at the University of Florida Research Center in Fort Lauderdale, bait stations were placed in soil around condominium buildings in areas infested with active Formosan termites. However, some of these bait stations were not found by foraging termites even though they were within 12 inches of the bait station. This is of particular interest as Formosan termites are far more aggressive than the Eastern subterranean species that flourishes in all the United States and in Canada. These scientists have concluded that subterranean termites find their food only by random probing and tubing through the soil medium. Even the manufacturers of this new baiting system have stated that the termite finds the baiting station only by chance and that there is nothing to attract the termite to the baiting station itself.

There remains, therefore, a very real and substantial need for an improved means of controlling termites in order to reduce the damage which colonies of such insects can produce to buildings and to their contents, such as wooden furniture, paper documents, books, boxes and leather shoes, for example, other human created structures, as well as materials which serve as food materials for termites, such as might be found in lumber yards. In addition, during their constant search for food and water, termites will chew through and damage non-cellulose items, such as polyvinyl chloride pipe, leather shoes, and swimming pool liners.

SUMMARY OF THE INVENTION

The present invention has met the above-described needs. In a preferred method of the invention, a plurality of bait stations is positioned in the soil within or adjacent to the region to be controlled and water is delivered to zones around the bait station to provide greater moisture within the soil zones than in adjacent areas in order to attract termites to the station. Not only does the greater moisture level within the soil zones attract the termites, but the greater moisture level will support more rapid fungal decomposition of the cellulosic termite food in the bait station. Volatile decomposition products of cellulosic material also attract termites. Water is preferably delivered at a predetermined rate primarily within or adjacent to the zones. The method may employ bait stations having a tubular member with wall openings and containing termite food. Also contained within the tubular member may be a termiticide. The preferred method employs an elongated hose to effect local delivery of water to the zones. In a further preferred practice of the invention the moisture content of the soil in the zone to be controlled is sensed and when the moisture level is not within a desired range, an adjustment in the rate of delivery of the water is provided.

The apparatus of the present invention has a plurality of bait stations disposed at least partially within the soil, water delivery means for delivering predetermined amounts of water to the zones containing the bait stations in order to provide a moisture content greater than the surrounding areas. The water discharge means may be an elongated hose having water discharge openings disposed adjacent to or within the zones to be controlled.

In one embodiment, moisture sensing means are provided within or adjacent to the zones to determine moisture content and control means responsive to receipt of moisture content information from the moisture sensing means permits adjustment in the delivery rate of water if the moisture content is not within a desired range.

In one embodiment, an elongated hose may have a series of T-branch segments delivering water to the zones. In another, apertured discs may serve as a discharge means for controlling the flow of water to the zones. In another embodiment, a weeper hose which has a plurality of openings adjacent to the areas where the discharge of water is desired may be employed.

It is an object of the present invention to provide an effective means of luring termites to bait stations in order to provide for more effective termite control and resistance to termite damage.

It is a further object of the present invention to provide an effective system for protecting a building or other man-made structure from termite damage.

It is yet another object of the present invention to provide effective means for destroying termite colonies while complying fully with all federal and state environmental standards.

It is yet another object of the invention to provide such a system which is compatible with the use of existing termite bait stations.

These and other objects of the invention will be more fully understood from the following description of the invention with reference to the drawings appended hereto.

DESCRIPTION OF THE PREFERRED EMBODIMENT

As employed herein, the term "bait station" means a device or material which is positioned in an area where termite control is desired and may be at least partially below the soil surface and which provides termite food, such as wood, cellulose or other termite food and may also contain a termiticide, such as a termite growth regulator or a toxicant.

As employed herein, the term "termiticide" means a material or mixture of materials which destroy or repel termites, or resist or prevent termite infestation, and shall expressly include, but not be limited to termite growth regulators and materials that are toxic to termites, i.e., toxicants.

Figure 1:
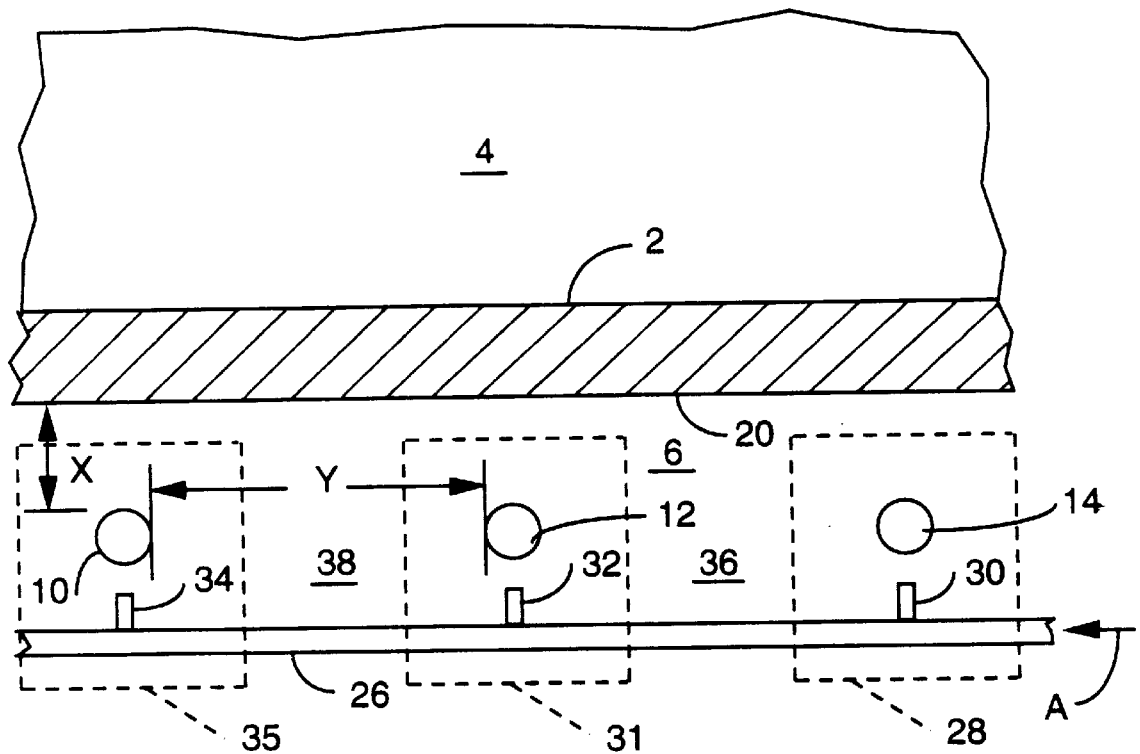
FIG. 1 is a schematic plan view of an embodiment of the present invention used adjacent to a building.

Referring to FIG. 1, there is shown in plan a wall 2, which may be a foundation of a building and, for example, is disposed under the soil surface level. The interior of the building is generally indicated by the reference number 4 and the soil on the exterior of the building is indicated generally by the reference number 6. In the embodiment shown in FIG. 1, a plurality of bait stations 10, 12, 14 are shown positioned a distance X from the building and a distance Y from the next adjacent bait stations 10, 12. Measurement has been made between the exteriors of the bait stations, 10, 12. It is preferred that the bait station 10 be spaced a distance X from the exterior surface 20 of the building foundation 2 which is preferably about 1 to 10 feet.

The distance Y between adjacent bait stations 10, 12 or 12, 14 is preferably about 5 to 25 feet. Positioning the bait stations 10, 12, 14 in this manner, with respect to the building, structure, or other material to be protected, will maximize the likelihood of effective termite destruction.

The present invention contemplates providing enhanced moisture in the soil disposed in a zone around a bait station 10, 12, 14 so as to serve as a positive attractant to lure the termites to the bait station. A preferred approach to doing this is to employ an elongated hose 26, which may be a flexible hose, and is oriented generally parallel to the direction of a line drawn through the centers of bait stations 10, 12, 14. The hose 26 will preferably be positioned about 6 to 24 inches from the nearest portions of the bait stations. A zone around a bait station, such as 14, is shown by the square 28. This zone may have an area of about 1 to 16 square feet, for example. The objective is to have the moisture content of the soil within a zone, such as 28, greater than the moisture content in adjacent areas of the soil which do not surround a bait station. Such areas in FIG. 1 would appear below zone 28 and to the right of zone 28, assuming there were no other bait station located there. Also, the space between zone 28 and the exterior surface 20 of wall 2 would be an area of lesser moisture content. Similar zones 31, 35 would be provided around bait stations 10 and 12. The soil in the areas 36, 38 between such similar zones 31, 35 could be of lower moisture content than the soil within the zones.

In delivering water to zones, water flows through the hose 26 in the direction indicated by arrow A. The hose has a plurality of discharge outlets 30, 32, 34 which provide for discharge of water within zones, such as 28, adjacent to the respective bait stations 10, 12, 14. In establishing the rate of flow out of the respective discharge openings 30, 32, 34, one may employ T-shaped connections to hoses and reduced diameter for the tubular sections 30, 32, 34 with respect to the diameter of main hose 26. For example, the main hose may have a diameter of about $3/8$ to $1/2$ inch and the secondary hoses 30, 32, 34 may have diameter of about $1/32$ to $1/16$ inches. If desired, adjustable discharge orifices could be provided on outlet hoses 30, 32, 34 in order to permit independent adjustability of delivery to the respective bait traps, 10, 12, 14. The hose may be placed about 6 to 24 inches from the closest portions of said bait stations.

It will be appreciated that in this manner random encounters between the termites and the bait stations 10, 12, 14 is eliminated. The enhanced moisture content of the zones, such as 28, 30, 31 serves as a positive attractant to lure the termites to the bait stations 10, 12, 14.

Figure 2:
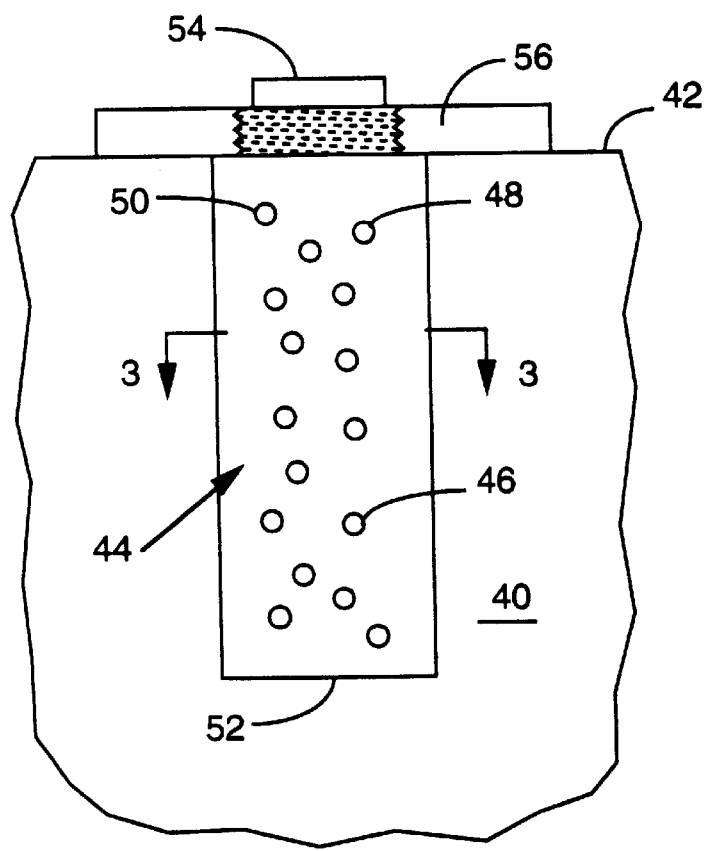
FIG. 2 is a subterranean elevational view showing a form of bait station.
Figure 3:
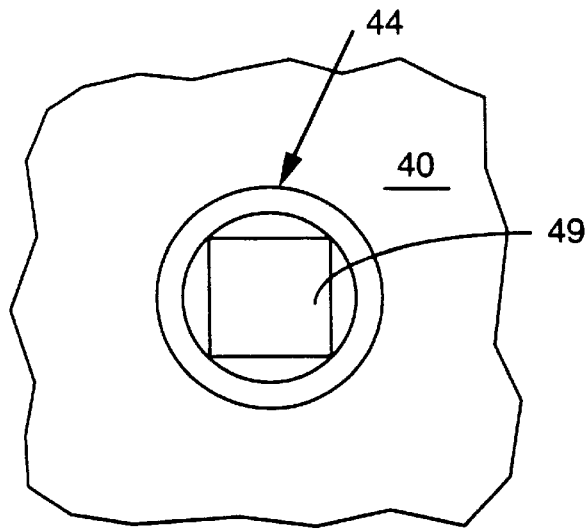
FIG. 3 is a cross-sectional view taken through 3—3 of FIG. 2 showing a portion of the interior of a bait station.

Referring to FIGS. 2 and 3, a preferred form of bait station, which is known to the prior art, will be considered. The soil 40 has an upper surface 42 within which is buried an elongated generally cylindrical plastic container 44 which has a plurality of openings in the sidewall, such as 46, 48 and 50, for example. A bottom closure 52 is provided for the container 44. A removable top closure 54 is threadedly secured to an opening in upper flange 56 of container 44. The flange 56 may rest on the surface 42 of the soil such that closure 54 is readily accessible. The container may be made of a suitable resinous plastic material which has sufficient strength and rigidity so as to remain durable. Disposed within the container 44 is a block 49 of termite food which may consist of wood, cellulose, sawdust or shredded paper, for example. Pest control operators may locate the bait stations 10, 12, 14 by having a map of bait station placement or by visual inspection to view flange 56 and closure 54.

In the conventional use of this type of bait station which is sold by DowElanco under the trade designation Sentricon System. The station is installed and after a period of weeks or months, an inspection is made to determine whether termites have been eating the food 49. If so, the food and termites present in the food are removed from the container 44 and a substitute food member which contains a termiticide is placed within container 44. The termites removed with the food are returned to the container 44. It is checked at periodic intervals, such as about one week to several months to determine whether there is need to replenish the termiticide containing food supply.

Figure 4:
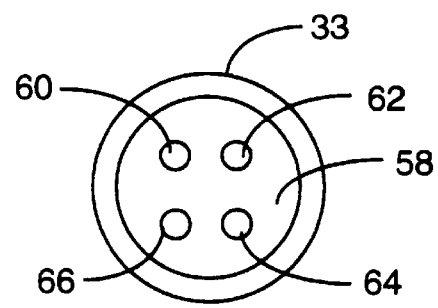
FIG. 4 is an illustration of a water discharge disc employable in the present invention.

Referring once again to FIG. 1 and with further reference to FIG. 4, a further means for restricting flow to zones 28, 31, 35 surrounding bait traps 10, 12, 14 will be considered. In this embodiment, a hose branch, such as 33, is provided with an insert disc 58 which has a plurality of openings 60, 62, 64, 66 which restrict the discharge flow of water to zone 28. In lieu of this approach, one may remove a section of hose 76 and replace it with a section of weeping hose which has openings in the hose wall on the side adjacent to the bait stations 10, 12, 14 and thereby moisten the soil adjacent to the bait stations and eliminate the need for delivery tubes 30, 32, 34. Water will weep through the weeping hose section. Obviously, other means may be employed to mechanically restrict water flow to the zones 28, 31, 35 around the bait stations 10, 12, 14 as by water permeable hose portions.

Figure 5:
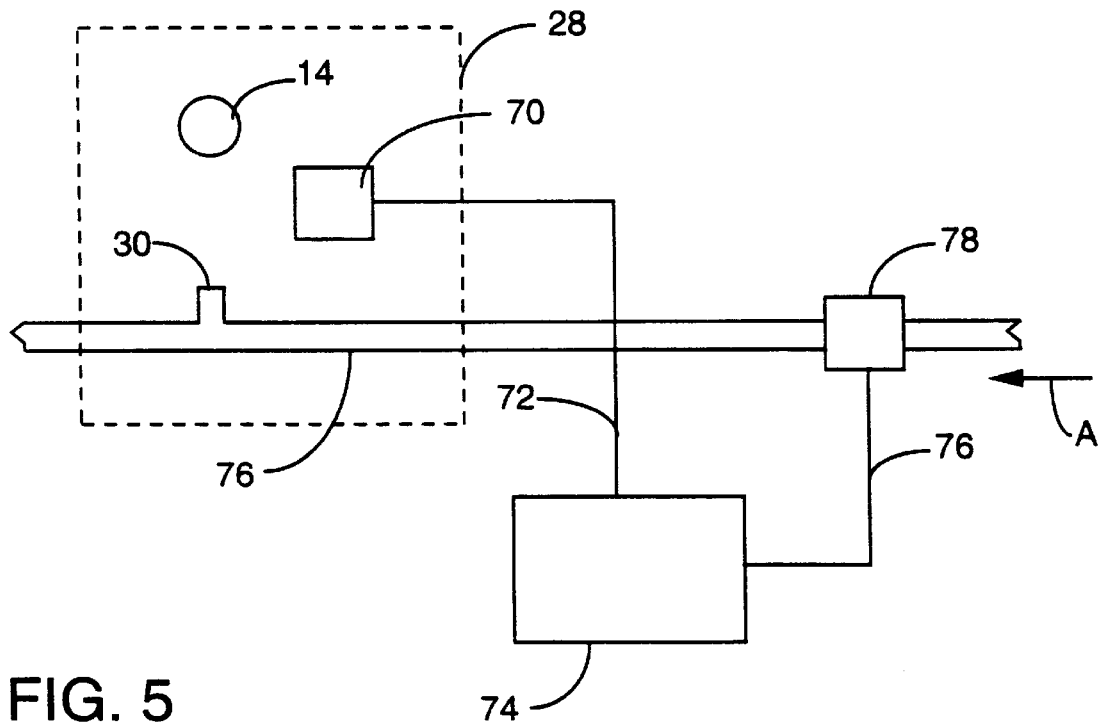
FIG. 5 is a schematic illustration of a moisture monitoring means of the present invention.

Referring to FIG. 5, a further embodiment of the present invention will be considered. In general, it will be desired to have the moisture content within the zones, such as 28, higher than that in surrounding areas. In a preferred embodiment, the moisture content in the soil zones around the bait stations 10, 12, 14 will be about 50 to 100 percent of the moisture capacity of the soil. In this embodiment of the invention means are provided for monitoring the moisture content of the soil and automatically adjusting the rate of water delivery to facilitate maintaining the desired moisture content. In this embodiment, a moisture sensor 70, which may be of the Rygrometer type, monitors the moisture content of the soli within zone 28 and, by line 72, delivers information regarding the same to controller 74. When there is a departure from the desired range of moisture content, an output signal over lead 76 is provided to valve 78 in order to adjust the position of the valve which is operatively associated with hose 26 to thereby alter the flow rate of water through hose 26. In this manner, adjustment in the rate of water delivery is effected in order to seek to establish the desired high soil moisture content within the zone as compared with adjacent areas.

In this embodiment, all or portions of the moisture monitoring system may be buried in the soil to resist undesired damage by lawn mowers, other equipment, or vandals, for example. The water delivery may be made beneath the soil surface.

It will be appreciated that the foregoing provides an effective means of positively luring termites to bait stations so as to thereby enhance the likelihood of resisting undesired termite damage and destroying the damage creating termites in the locale of particular interest. This is accomplished in a simple, economical manner while permitting employment of conventional bait stations.

It will be appreciated that while for convenience of reference, a preferred type of bait station has been disclosed, other types of bait stations may be employed. It will further be appreciated that while a system wherein a predetermined quantity of water is delivered through a hose, such as, for example, a ⅛ inch hose delivering one gallon per day, subdivided over the various outlet zones, will effectively accomplish the objective, in some instances, an automated system, such as that of FIG. 5, might be desired.

While certain preferred distances between bait stations, between bait stations and a building, and the size of soil zones have been recited herein, the invention is not so limited.

Whereas particular embodiments of the invention have been described herein for purposes of illustration, it will be evident to those skilled in the art that numerous variations of the details may be made without departing from the invention as defined in the appended claims.

We claim:

1. Apparatus for controlling termites comprising a plurality of bait stations disposed at least partially within the soil, said bait stations containing at least one of a termite food and a termiticide, and water delivery means for delivering predetermined amounts of water to zones containing said bait stations in order to provide higher moisture content within the soil surrounding said bait stations than in adjacent areas, wherein the water is not delivered from within said bait stations.

2. The apparatus of claim 1 including said water delivery means having water discharge means disposed within said high moisture zones.

3. The apparatus of claim 2 including said water delivery means including elongated hose means having means for discharging water in said zones.

4. The apparatus of claim 2 including said discharging means including a restricted opening member.

5. The apparatus of claim 4 including said restricting opening member being an apertured disc.

6. The apparatus of claim 3 including valve means operatively associated with said hose means and said control means for adjusting the rate of water flow to said zones.

7. The apparatus of claim 3 including said hose means having branches for discharging water adjacent to or within said zones.

8. The apparatus of claim 3 including said elongated hose means being a weeping hose having a plurality of openings in the hose wall within said zones.

9. The apparatus of claim 2 including said container having a plurality of openings whereby termites and moisture can pass through the wall of said container.

10. The apparatus of claim 2 including said bait stations being disposed about 1 to 10 feet from the foundation of a building.

11. The apparatus of claim 1 including said bait stations being spaced an average of about 5 to 25 feet from the closest adjacent said bait station.

12. The apparatus of claim 1 including moisture sensing means for sensing the moisture content in said zones, and control means for adjusting the water delivery means when said moisture content departs from a desired level.

13. A method of controlling termites comprising providing a plurality of bait stations in the soil within a region to be controlled, said bait stations containing at least one of a termite food and a termiticide, and delivering water to zones around said bait stations to provide greater moisture content within said soil zones than in adjacent areas in order to attract said termites to said bait stations, wherein the water is not delivered from within said bait stations.

14. The method of claim 13 including effecting said water delivery at a predetermined rate.

15. The method of claim 14 including effecting said water delivery primarily within said zones around said bait stations.

16. The method of claim 14 including delivering said water under the surface of said soil.

17. The method of claim 16 including employing as said bait stations a tubular member having wall openings and containing a termite food.

18. The method of claim 17 including said termite food including at least one material selected from the group consisting of wood, cellulose, sawdust, and shredded paper.

19. The method of claim 14 including periodically examining said termite food to determine if termites have been feeding on said food and if so replacing said termite food with termite food containing a termiticide.

20. The method of claim 14 including employing an elongated hose having water delivery sections at a plurality of locations to effect said water delivery to said bait stations.

21. The method of claim 20 including positioning said hose underground within about 6 to 24 inches from the nearest portions of said bait stations.

22. The method of claim 20 including employing water permeable hose portions as said water delivery sections.

23. The method of claim 20 including employing weeping hose sections as said water delivery sections.

24. The method of claim 14 including maintaining said soil moisture content within a predetermined range.

25. The method of claim 21 including sensing the moisture within at least one of said zones and if the moisture level is not within said desired range adjusting the rate of water delivery.

26. The method of claim 25 including periodically repeating said sensing of the moisture content within at least said one zone and effecting adjustments in the rate of water delivery if the moisture level is not within said desired range.

27. The method of claim 14 including positioning at least some of said bait stations adjacent to a building.

28. The method of claim 27 including positioning said bait stations about 1 to 10 feet from said building.

29. The method of claim 13 including employing said soil zones of an area of about 1 to 16 square feet.

30. The method of claim 13 including maintaining the moisture content within said soil zones at about 50 to 100 percent of the moisture capacity of said soil.

* * * * *